(12) United States Patent
Vögler et al.

(10) Patent No.: US 8,621,827 B2
(45) Date of Patent: Jan. 7, 2014

(54) SONOTRODE

(75) Inventors: Ulrich Vögler, Uhldingen (DE); Francesco Giordano, Bologna (IT); Sergio Mancin, Fidenza (IT); Antonio Melandri, Rubiera (IT); Magnus Råbe, Åkarp (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 13/636,501

(22) PCT Filed: Mar. 15, 2011

(86) PCT No.: PCT/EP2011/053919
§ 371 (c)(1),
(2), (4) Date: Sep. 21, 2012

(87) PCT Pub. No.: WO2011/117119
PCT Pub. Date: Sep. 29, 2011

(65) Prior Publication Data
US 2013/0008132 A1 Jan. 10, 2013

(30) Foreign Application Priority Data
Mar. 22, 2010 (EP) .................................... 10157256

(51) Int. Cl.
*B65B 7/00* (2006.01)
(52) U.S. Cl.
USPC .............. 53/285; 53/370.7; 53/373.7; 53/551
(58) Field of Classification Search
USPC .............................. 53/285, 370.7, 373.7, 551
See application file for complete search history.

(56) References Cited

U.S. PATENT DOCUMENTS

| 6,153,964 A | 11/2000 | Olsson et al. |
| 6,482,291 B1 | 11/2002 | Kume et al. |

(Continued)

FOREIGN PATENT DOCUMENTS

| EP | 0615907 B1 | 10/1997 |
| EP | 1127794 A2 | 8/2001 |
| EP | 1241099 A1 | 9/2002 |
| WO | WO 2007/020208 | 2/2007 |

OTHER PUBLICATIONS

International Search Report (PCT/ISA/210) issued on May 20, 2011, by the European Patent Office as the International Searching Authority for International Application No. PCT/EP2011/053919.

(Continued)

*Primary Examiner* — Hemant M Desai
(74) *Attorney, Agent, or Firm* — Buchanan Ingersoll & Rooney PC

(57) ABSTRACT

A sonotrode comprising: a head defining a sealing surface elongated along a first direction; and a first and a second drive unit distinct from one another, each comprising at least one piezo-electric element; wherein first and second drive unit may be electrically fed by an unique generator to cause oscillation of head; the height of head measured along a second direction transversal to sealing surface being substantially equal to half the wavelength of wave oscillating in second direction; at least one slot extending through head transversally to first and second direction; a finite number of nodal points at which amplitude of oscillation of head is substantially equal to zero; and a plane on which at least some nodal points lie and which divides head in a first portion and second portion; the slot extends completely within one only between first and second portion and at a certain distance by plane.

18 Claims, 7 Drawing Sheets

(56) References Cited

U.S. PATENT DOCUMENTS

| | | | |
|---|---|---|---|
| 7,344,620 B2* | 3/2008 | Jung | 156/580.2 |
| 7,802,604 B2* | 9/2010 | Martin et al. | 156/580.2 |
| 2004/0031554 A1* | 2/2004 | Moglich | 156/73.1 |
| 2005/0247408 A1* | 11/2005 | Jung | 156/580.1 |
| 2010/0139867 A1 | 6/2010 | Martin et al. | |
| 2011/0030315 A1* | 2/2011 | Mancin et al. | 53/285 |
| 2011/0259526 A1* | 10/2011 | Eder | 156/510 |

OTHER PUBLICATIONS

International Preliminary Report on Patentability (PCT/IPEA/409) issued on Jul. 25, 2012, by the European Patent Office as the International Examining Authority for International Application No. PCT/EP2011/053919.

* cited by examiner

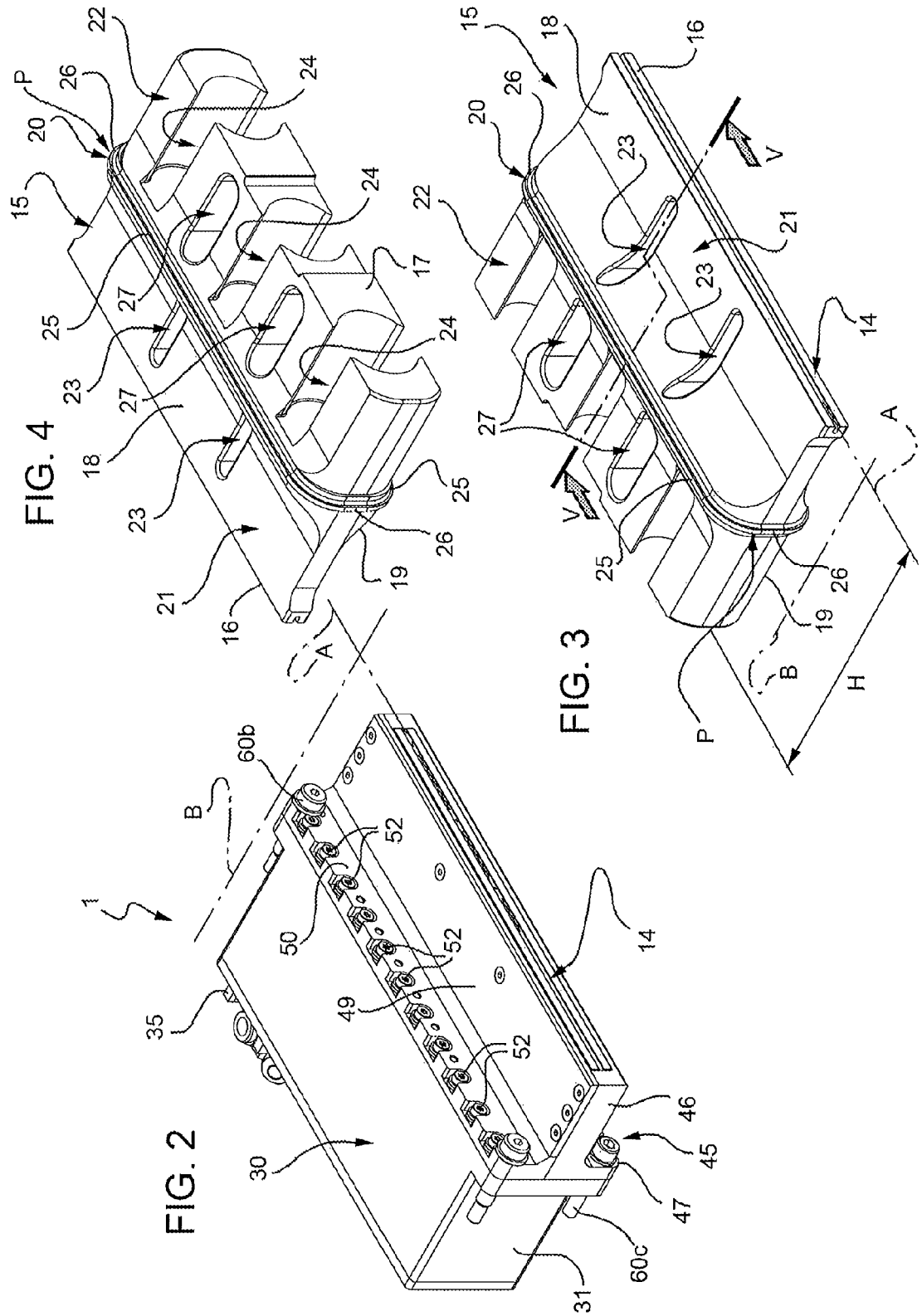

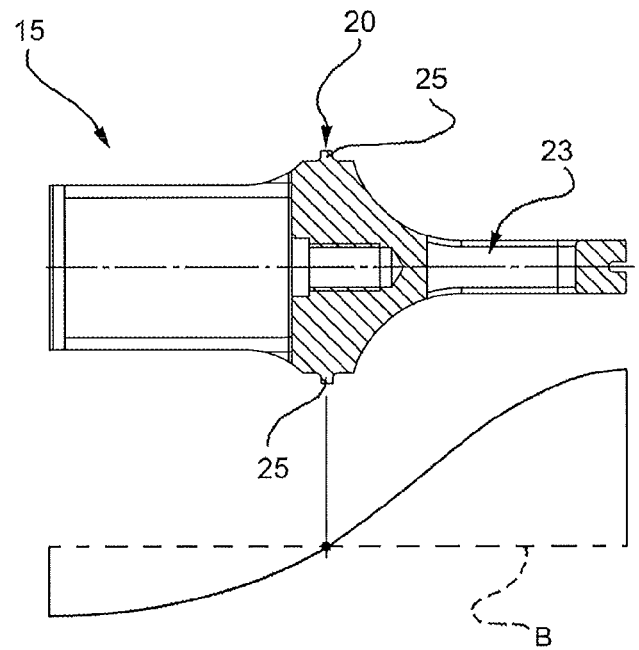
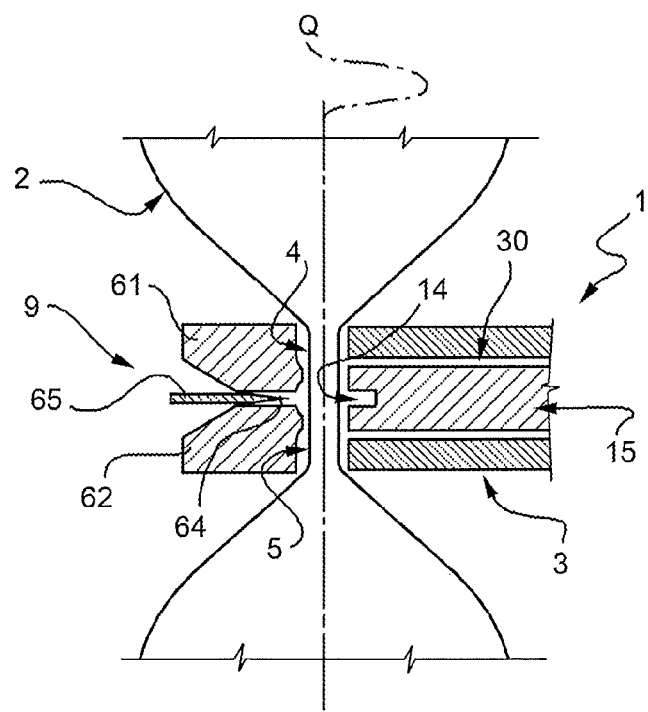

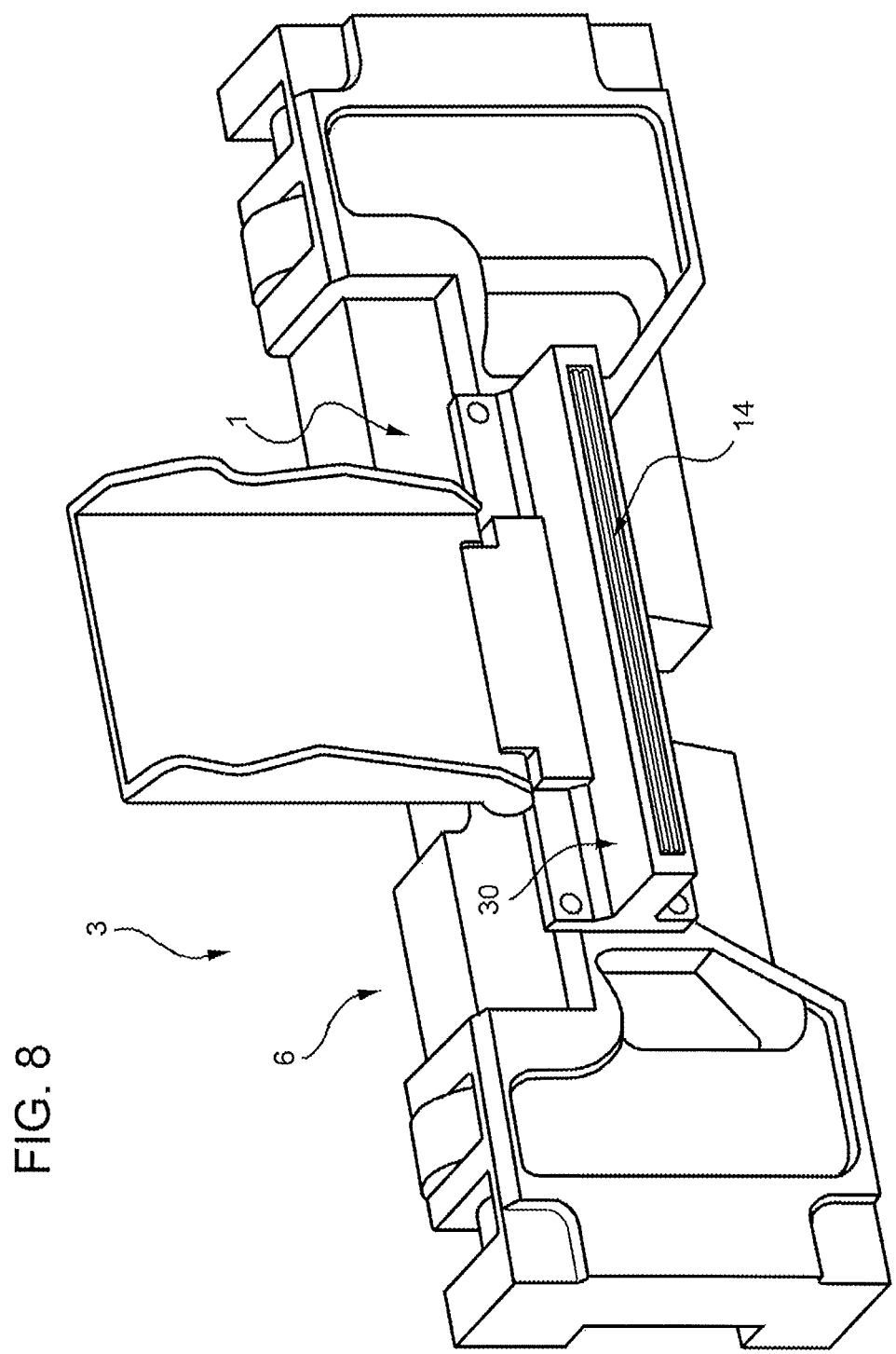

SONOTRODE

This application is a 371 of PCT/EP11/53919 filed on Mar. 15, 2011, which claims priority to EPO No. 10157256.8, filed Mar. 22, 2010, the technical disclosures of which are hereby incorporated by reference.

The present invention relates to a sonotrode.

Many pourable food products, such as fruit juice, pasteurized or UHT (ultra-high-temperature processed) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may comprise a layer of fibrous material, e.g. paper, or of mineral-filled polypropylene material; and a number of layers of heat-seal plastic material, e.g. polyethylene film, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH), which is superimposed on a layer of heat-seal plastic material, and is in turn covered with another layer of heat-seal plastic material forming the inner face of the package eventually contacting the food product.

As is known, such packages are made on fully automatic packaging machines, on which a continuous tube is formed from the web-fed packaging material; the web of packaging material is sterilized on the packaging machine itself, e.g. by applying a chemical sterilizing agent, such as a hydrogen peroxide solution, which, after sterilization, is removed, e.g. vaporized by heating, from the surfaces of the packaging material; and the web of packaging material so sterilized is maintained in a closed sterile environment, and is folded and sealed longitudinally to form a vertical tube.

The tube is filled from the top with the sterilized or sterile-processed food product, and is gripped at equally spaced cross sections by two pairs of jaws. More specifically, the pairs of jaws act cyclically and successively on the tube to seal the packaging material of the tube and form a continuous strip of pillow packs connected to one another by respective transversal sealing bands.

The pillow packs are separated by cutting the relative sealing bands, and are then conveyed to a final folding station where they are folded mechanically into the finished parallelepiped shape.

In a first alternative, the packaging machine comprises two forming assemblies movable along respective guides and which interact cyclically with the tube to heat seal the packaging material of the tube. Each forming assembly comprises a slide movable back and forth along respective guide; and the two jaws which are hinged at the bottom to the respective slide, and move between a closed position, in which they cooperate with the tube to seal it, and an open position in which they are detached from the tube.

In a second alternative, the packaging machine comprises two chain conveyors defining respective endless path and fitted with respective number of jaws. The two paths have respective branches substantially facing and parallel to each other, and between which the tube of packaging material is fed so that the jaws on one conveyor cooperate with the corresponding jaws on the other conveyor along branches of respective paths, to grip the tube at a number of successive cross sections, and to seal and cut the packs.

In the case of aseptic packages with an aluminium layer as the barrier material, the cross sections of the tube are normally sealed by induction of leakage current in the aluminium layer to melt the heat-seal plastic material locally.

More specifically, one of the jaws in each pair comprises a main body made of nonconductive material, and an inductor housed in a face seat on the main body; while the other jaw has pressure pads made of flexible material, such as rubber.

The inductor is energized when the relative pair of jaws grips the tube, so as to seal a cross section of the tube by heat sealing the plastic covering material.

In the case of packages with no layer of aluminium or other electrically conductive materials, the cross sections of the tube are normally sealed using a hot plate for locally heating the packaging material inwards.

More specifically, one of the jaws is equipped with a hot plate, while the other normally has one or more pressure pads of flexible material. This method, commonly referred to as "hot-plate" sealing, calls for relatively prolonged contact between the hot plate and the packaging material.

To accelerate local melting of the packaging material, and so increase package production speed, increasing use is made of ultrasonic sealing devices, which substantially comprise a mechanical-vibration generator or sonotrode and an anvil—known for example from EP-B-615907 in the name of the same Applicant—fitted to respective jaws in each pair and which cooperate with each other to heat the packaging material by means of ultrasonic vibrations.

More precisely, the sonotrode disclosed in EP-B-615907 substantially comprises a head and a unique drive unit which consists of a stack of alternate piezoelectric ceramic plates and conductive metal sheets.

The head defines a sealing surface which extends along a first direction, and the drive unit is fitted to the head on the opposite side of the sealing surface.

The drive unit is coupled to an alternate current generator. In this way, the piezoelectric ceramic plates convert the electrical supplied voltage into a mechanical strain which causes the oscillation of the head and, therefore, the sealing of the transversal sealing band.

In particular, the sonotrode constitutes a half-wave resonator, i.e. the entire length of the sonotrode along a second direction orthogonal to the first direction consists of half a wave length of the oscillation of the head.

Ultrasonic sealing devices of the type described in EP-B-615907 have the following drawback.

When a longer transversal sealing band is desired, for example for transversally sealing a particularly high package, a plurality of the above-described sonotrodes are interconnected for an additional length.

However, the inevitable errors during the interconnection of the sonotrodes are likely to generate a non-uniform vibration between such sonotrodes. Accordingly, the resulting transversal sealing band may be uneven.

To overcome this drawback, WO-A-2007/020208, in the name of the same Applicant, discloses a single-piece sonotrode which accommodates three driven units fed by a single generator. In greater detail, drive units are fixed into respective recesses of the sonotrode, and have respective plurality of piezo-elements.

Furthermore, the sonotrode disclosed in WO-A-2007/020208 comprises a pair of slots which are arranged between respective couples of drive units adjacent to one another.

Finally, the sonotrode comprises a plurality, in particular three pairs, of S-shaped hooks for fixing the sonotrode to the frame of the jaw. The S-shaped hooks of each pair are arranged on opposite lateral side surfaces of the sonotrode and may be welded or unitarily formed to the sonotrode. Accordingly, the sonotrode is prevented from oscillating at the S-shaped hooks. In other words, the S-shaped hooks define respective nodal points of the sonotrode and lie on a "so-called" nodal plane of such sonotrode.

More precisely, slots extend orthogonal to a sealing surface of the sonotrode and between two subsequent pairs of S-shaped hooks. In particular, slots extend both above and below the S-shaped hooks. Accordingly, slots pass through the nodal plane of the sonotrode.

The Applicant has found that the vibration of the sonotrode disclosed WO-A-2007/020208 is made unstable by some additional parasitic frequencies.

Accordingly, the resulting transversal sealing band may still be not completely uniform and continuous. Furthermore, these additional parasitic frequencies result in additional fatigue stresses onto the sonotrode, with a consequent reduction of its fatigue residual life.

A need is felt within the industry to obtain a sonotrode which is able to generate a considerable long sealing band and the vibration of which is as less as possible affected by the above-mentioned additional frequencies.

A need is also felt within the industry to reduce as far as possible the power losses due to the water stagnation within the sonotrode, so as to limit the consequent reduction of the effective sealing time and, therefore, the risk that the sealing band remains partially unsealed.

A need is finally felt within the industry to distance as far as possible the parasitic frequencies of the sonotrode.

EP-A-1241099 discloses an ultrasonic sealing device which comprises a casing fixed to one of the jaw, and three distinct sonotrodes arranged side by side and housed in the casing.

The sealing device also comprises two beamlike intermediate supports located each between the heads of two sonotrodes adjacent to each other.

In particular, the head of each sonotrode does not have any slot therein.

It is an object of the present invention to provide a sonotrode, designed to meet at least one of the aforementioned needs.

According to the present invention, there is provided a sonotrode, as claimed in claim 1.

A preferred, non-limiting embodiment of the present invention will be described by way of example with reference to the accompanying drawings, in which:

FIG. 2 is a perspective view of the sonotrode of FIG. 1 once assembled;

FIGS. 3 and 4 are respectively a frontal and a rear perspective view of a head of the sonotrode of FIGS. 1 and 2, with parts removed for clarity;

FIG. 5 is a section along line V-V of FIG. 3;

FIG. 7 is a schematic view of the sonotrode of FIGS. 1 to 4 during a sealing phase of a tube of packaging material;

FIG. 8 shows a jaw and the sonotrode of FIGS. 1 to 7 which is attached to the jaw;

Figure 1:
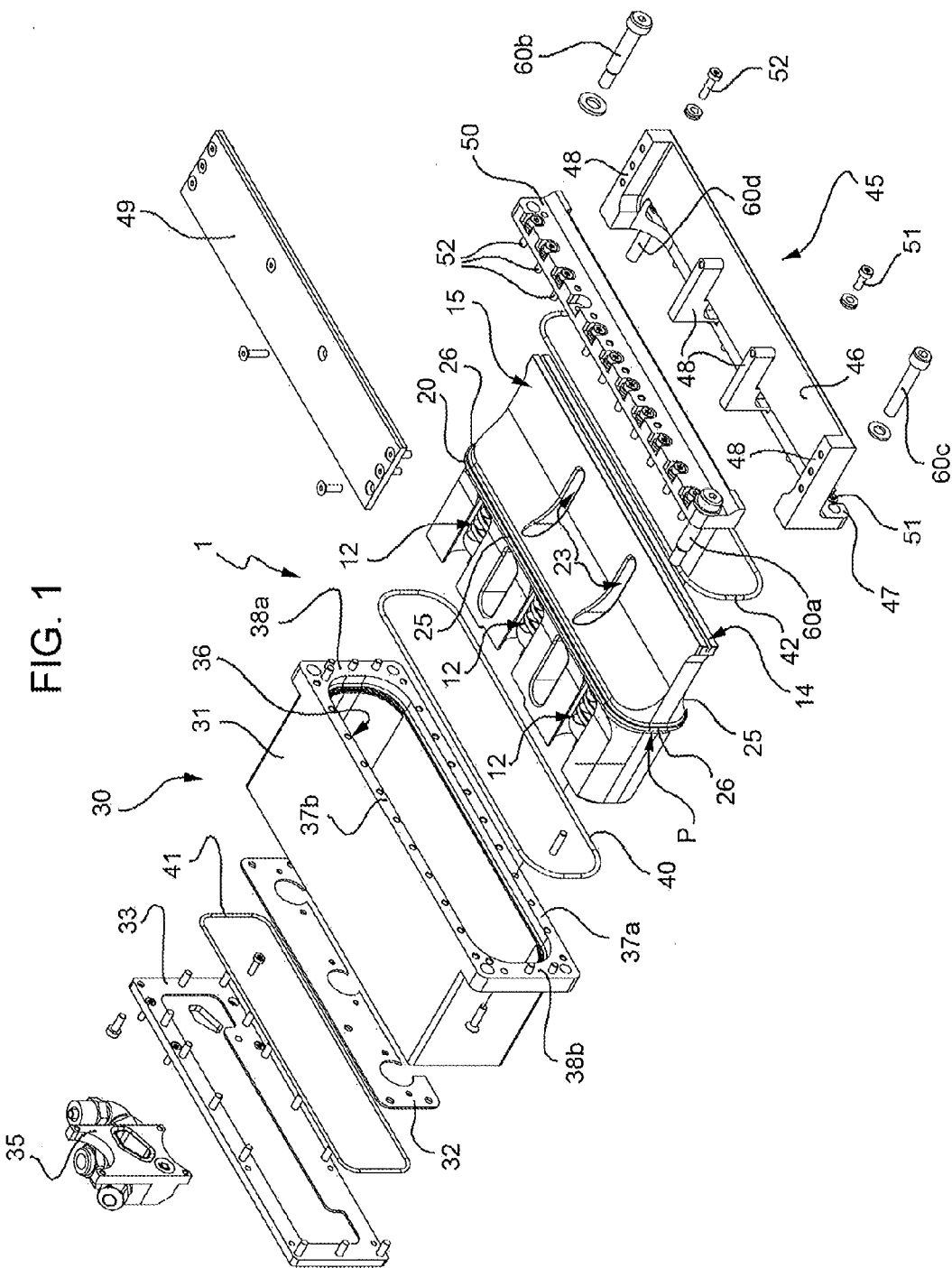
FIG. 1 is an exploded perspective view of a sonotrode according to the present invention, with parts removed for clarity.

Number 1 in FIG. 1 indicates as a whole a sonotrode in accordance with the present invention.

Sonotrode 1 may be incorporated in a packaging machine (not shown) for producing sealed packages of a pourable food product, such as pasteurized or UHT milk, fruit juice, wine, etc., from a tube 2 of packaging material fed by known devices (not shown) along a vertical path Q (FIG. 7).

Tube 2 is formed in known manner by longitudinally folding and sealing a web of heat-seal sheet material, and is filled continuously from the top with the sterilized or sterile-processed food product.

Packaging machine comprises, in known manner, at least one pair of forming assemblies 3 (only one shown in FIG. 8) which interact cyclically and successively with tube 2 of packaging material to grip, ultrasonically seal, and cut tube 2 along equally spaced cross sections.

More specifically, forming assemblies 3 interact with tube 2 to first convert the tube into a vertical strip 4 of packages connected to one another by respective transversal sealing bands 5, along which tube 2 is then cut.

Each forming assembly 3—described herein only as required for a clear understanding of the present invention—substantially comprises a jaw 6 (FIG. 8) and a counterjaw, which are located on opposite sides of tube 2, supports a mechanical-vibration generator or sonotrode 1 and an anvil 9 respectively, and are movable, in a direction crosswise to path P, between an open configuration and a closed configuration in which they grip and seal tube 2 at a relative cross section to form a relative sealing band 5 of package strip 4.

In a first alternative of packaging machine, forming assemblies 3 move along respective guides and interact cyclically with tube 2 to heat seal the packaging material of tube 2. Each forming assembly 3 comprises a slide movable back and forth along respective guide; and a jaw 6 and a counterjaw which are hinged at the bottom to the respective slide, and move between a closed position, in which they cooperate with tube 2 to seal it, and an open position in which they are detached from tube 2.

In a second alternative, packaging machine comprises two chain conveyors defining respective endless path and fitted with respective number of jaws 6 and corresponding counter-jaws. The two paths have respective branches substantially facing and parallel to each other, and between which tube 2 of packaging material is fed so that jaws 6 on one conveyor cooperate with corresponding counter-jaws on the other conveyor along said branches of respective paths, to grip the tube at a number of successive cross sections, and to seal and cut the packs.

Figure 6:
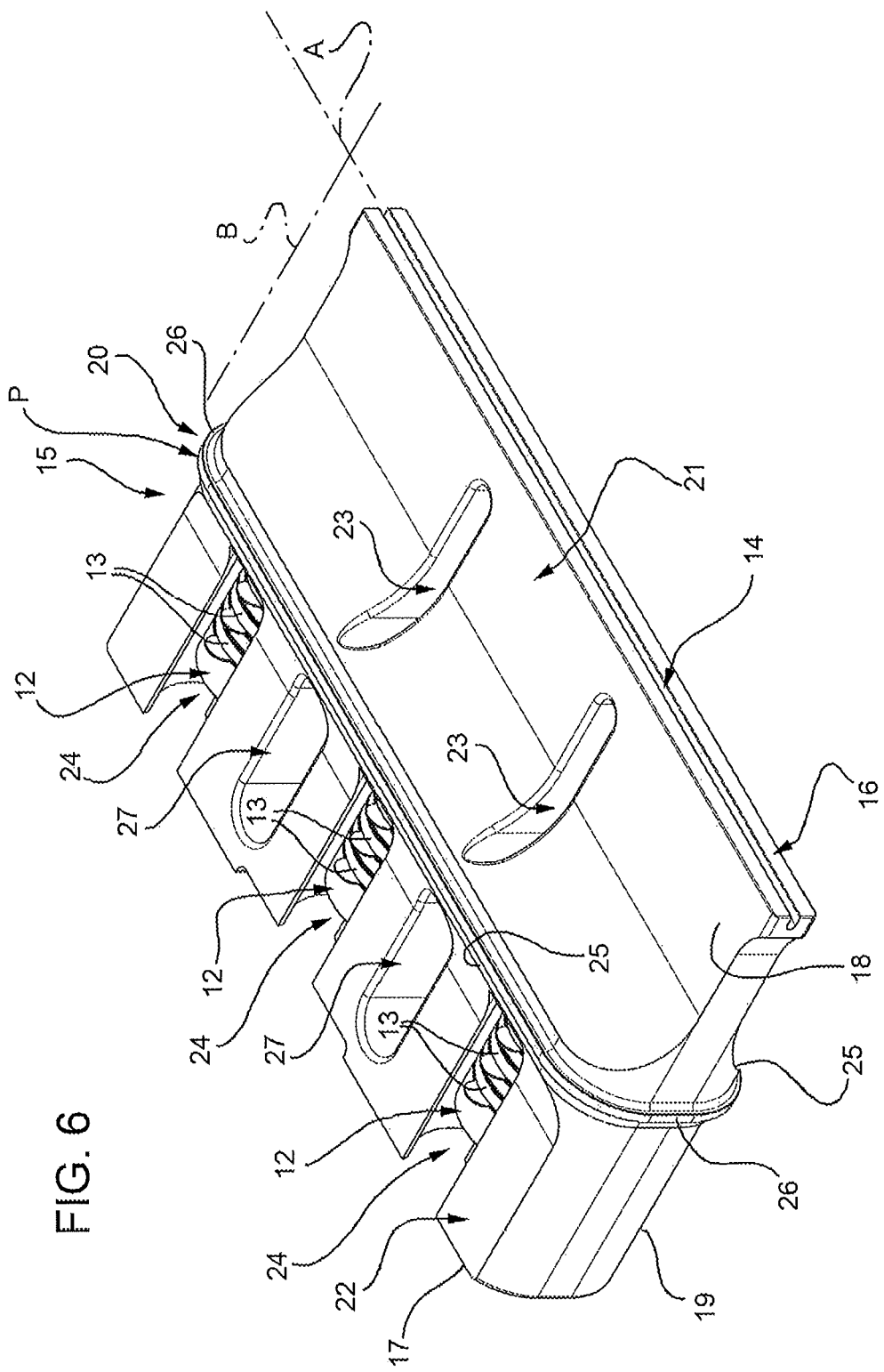
FIG. 6 is a perspective view of the head of the sonotrode of FIGS. 3 and 4 with a plurality of piezo-electric elements mounted thereon.

Sonotrode 1 substantially comprises (FIGS. 1 to 6 and 9):
a single-piece head 15 which define a sealing surface 14 extending along direction A;
a plurality, three in the embodiment shown, of drive units 12 connected to head 15 and each comprising a plurality of stacked piezo-electric elements 13 (FIG. 6); and
a casing 30 which houses head 15.

Packaging machine also comprises a unique alternate current generator (not shown) which is electrically connected, in use, with all drive units 12.

In greater detail, head 15 is delimited by a pair of walls 16, 17 opposite to one another, and a pair of walls 18, 19 opposite to one another and interposed between walls 16, 17.

Wall 16 defines sealing surface 14.

Sonotrode 1 constitutes a half-wave resonator, i.e. the entire length of the sonotrode 1 along direction B consist of half a wave length of the oscillation of head 15.

In particular, height H of head 15 measured along a direction B orthogonal to sealing surface 14 is equal to the half of the wavelength of the wave oscillating, in use, along direction B (FIG. 5).

As a result, the extension of piezoelectric elements along direction B is contained within extension of head 15 along direction B.

In this way, as shown in FIG. 5, the maximum amplitude of the oscillation of head 15 is achieved at sealing surface 14.

Head 15 comprises a continuous edge 20 shaped as a closed line and which defines a nodal line of the oscillation of head 15.

In other words, the points of edge 20 substantially do not oscillate when piezo-electric elements 13 of drive units 12 cause the oscillation of the remaining part of head 15.

Furthermore, the points of edge 20 define a so-called nodal surface, in particular a so-called nodal plane P which is orthogonal to direction B.

Edge 20 substantially comprises two segments 25 parallel to direction A and two segments 26 orthogonal to segments 25 and rounded, at their opposite ends, to segments 25.

Furthermore, plane P divides head 15 in a first and a second portion 21, 22.

Figure 9:
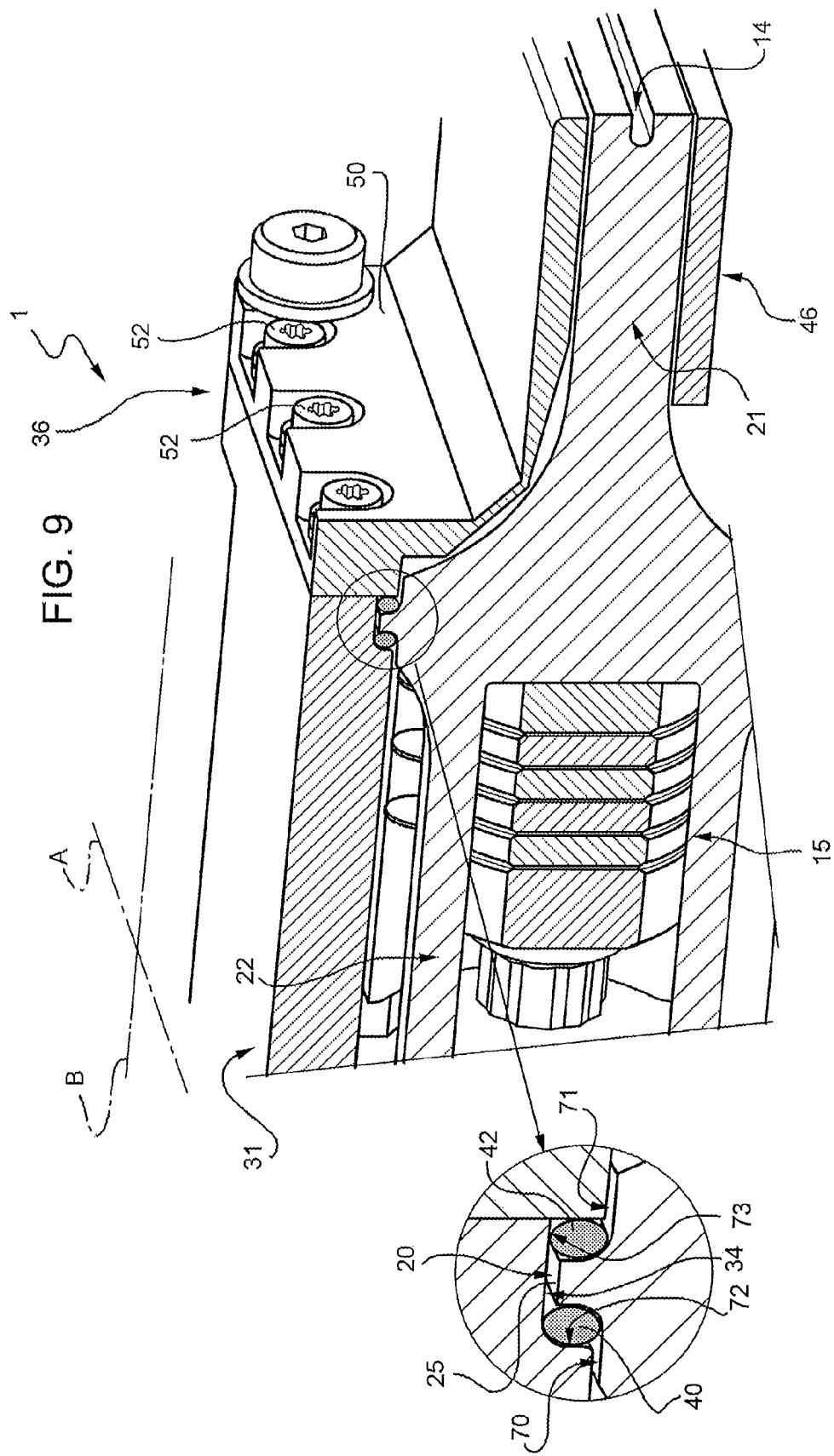
FIG. 9 is an enlarged perspective view of a section of some particulars of FIG. 2.

Head 15 also comprises a shoulder 70 and a shoulder 71 (FIG. 9). Edge 20 is interposed along direction B between shoulders 70, 71 and protrudes therefrom.

Drive units 12 have respective ends (FIG. 1) which lie onto plane P.

Portion 21, 22 respectively comprise wall 16, 17.

The thickness of portion 21 is at first constant and then increases, proceeding from surface 14 towards edge 20.

Portion 21, 22 further comprise respective pairs of slots 23, 27 which are elongated along direction B and pass through head 15 from wall 18 to wall 19.

Advantageously, slots 23 extend completely within portion 21, slots 27 extend completely within portions 22, and slots 23, 27 extend at certain distance from plane P. In other words, slots 23, 27 are detached from each other and do not cross plane P.

In other words, slots 23, 27 are interrupted at a certain distance from plane P.

In particular, slots 23 extend for their entire length between edge 20 and sealing surface 14.

Slots 27 extend on the opposite side of edge 20 with respect to slots 23, are arranged at the prolongation of respective slots 23 along direction B.

Portion 22 defines a plurality of seats 24, three in the embodiment shown, for respective drive units 12.

Head 15 is connected to casing 30 along edge 20.

Casing 30 comprises (FIGS. 1 and 2):
a box-shaped element 31 which houses portion 22 of head 15;
a plate 32 cooperating with the side of element 31 which is opposite to sealing surface 14;
a plate 33 cooperating with a portion of the side of plate 32 which is opposite to element 31 through the interposition of a sealing ring 41;
a connector 35 for connecting piezo-electric elements 13 to generator and cooperating with an additional portion of the side of plate 33 which is opposite to plate 32.

Element 31 comprises, on the opposite side to plate 32, an end edge 36.

Edge 36 is rectangular and comprises two long sides 37a, 37b parallel to direction A and two short sides 38a, 38b orthogonal to and interposed between sides 37a, 37b.

As shown in FIG. 9, element 31 also comprises a relief 34 and a shoulder 72 which is rounded to relief 34. More precisely, relief 34 extends between shoulder 72 and an inner profile of edge 36.

A sealing ring 40 is interposed along direction B between edge 20 and shoulder 72 of element 31, and is mounted between shoulder 70 and a portion of relief 34 adjacent to shoulder 72.

In the same way, a sealing ring 42 is mounted between shoulder 71 and an end portion 73 of relief 34.

Casing 30 further comprises:
an element 45 which defines a plate 46, a crossbar elongated parallel to direction A and protruding downwards from plate 46, and a plurality, four in the embodiment shown, of spacers 48 spaced along direction A and protruding from plate 46 on the opposite side of crossbar 47;
a plate 49 fitted to element 45 through a plurality of screws;
a crossbar 50.

Sealing ring 42 is interposed along direction B between edge 20 and crossbar 50.

Element 45, plate 49 and crossbar 50 define a hollow compartment which houses portion 21 of head 15.

Crossbar 47 is connected to side 37a of end edge 36 through a plurality of screws 51 while crossbar 50 is connected to side 37b of end edge 36 through a plurality of screws 52.

In this way, screws 51, 52 connect element 45 and crossbar 50 to element 31 respectively along sides 37a, 37b of end edge 36.

Casing 30 is connected to jaw 6 through a plurality, four in the embodiment shown, of screws 60a, 60b, 60c, 60d.

More precisely, screws 60a, 60b pass through first holes defined by opposite end of crossbar 50 and second holes defined by opposite end of side 37a of end edge 36, and are screwed to jaw 6.

Screws 60c, 60d pass through third holes defined by opposite end of crossbar 47 and fourth holes defined by opposite end of side 37b of end edge 36, and are screwed to jaw 6.

In this way, screws 60a, 60b, 60c, 60d connect casing 30 to jaw 6 at opposite end of sides 38a, 38b.

With reference to FIG. 7, anvil 9 is, in the embodiment shown, of the type described and illustrated in Patent EP-B-615907, and is substantially defined by two separate top and bottom portions 61, 62 defining in between a seat 64 for housing a knife 65. Very briefly, knife 65 is housed in sliding manner inside seat 64 of anvil 9, and is controlled by a known actuating device (not shown) to cut tube 2 at transversal sealing bands 5 and so detach from strip 4 the packages issuing from forming assembly 3 and to be folded into the finished shape.

The operation of sonotrode 1 is hereinafter described with reference to only a couple of jaw 6 and counterjaw, and starting from a configuration in which jaw 6 and counterjaw are in the closed configuration and grip tube 2 at a cross section.

In such configuration, sonotrode 1 cooperates with anvil 9 and the cross section of tube 2 is gripped therebetween.

At this stage, the generator feeds drive units 12 with a given value of alternate current, so causing the ultrasonic vibration of piezo-electric elements 13 and, therefore, of sonotrode 1.

The ultrasonic vibration of sonotrode 1 causes the sealing of tube 2 and the formation of sealing band 5.

In particular, as sonotrode 1 vibrates, continuous closed edge 20 does not oscillate.

In fact, edge 20 is arranged against end edge 36 of element 31 of casing 30;

element 31 of casing 30 is connected to element 45 and crossbar 50 along sides 37a, 37b of end edge 36; and end edge 36 of casing 30 is connected to jaw 6.

In other words, edge 20 forms a continuous closed nodal line of sonotrode 1.

Once drive units 12 are deactivated, and before jaw 6 and counterjaw are opened to commence the next forming cycle, knife 65 is activated and expelled from seat 64 in anvil 9 to cut the packaging material along the relative sealing band 5 and so detach from tube 2 a relative pillow pack which is subsequently folded into the finished shape.

The advantages of sonotrode 1 according to the present invention will be clear from the foregoing description.

In particular, slots 23, 27 extend completely within respective portions 21, 22 and at a certain distance from plane P, which is defined by the edge 20.

The Applicant has found that, due to the fact that slots 23, 27 do not pass through the plane P defined by the continuous nodal line of head 15, the vibration of sonotrode 1 substantially lacks the additional parasitic frequencies that affect the sonotrode disclosed in the introductory part of the present description.

Figure 10:
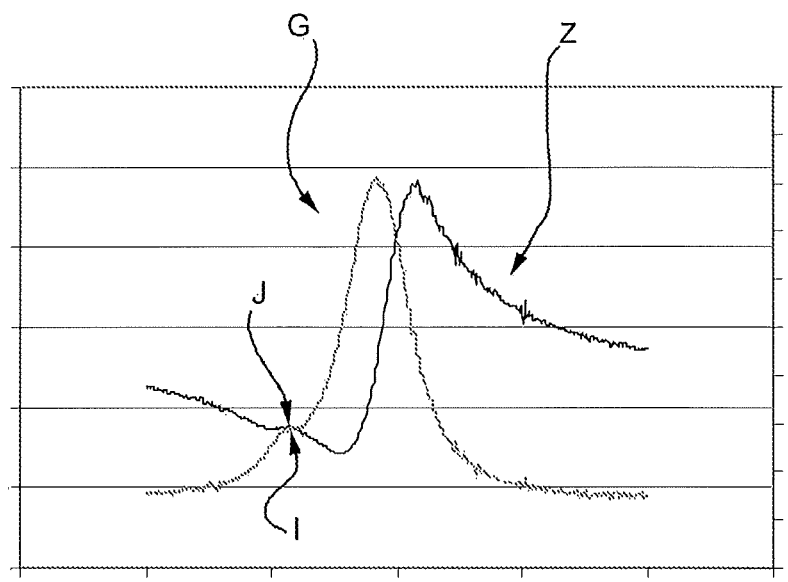
FIG. 10 shows the plot of the module and of the phase of the impedance of a known sonotrode as a function of the vibration frequency and at a constant-value of sealing force.

More precisely, the Applicant has found that, as shown in FIG. 10, the plots G, Z of the module and the phase of the impedance as a function of frequency and at a constant value of sealing force for a sonotrode similar to the one disclosed in WO-A-2007/020208 have respective low-frequency inflections I, J close to the resonance frequency and a succession of very close local maxima and minima.

The presence of inflections I, J and of very close maxima and minima is mainly due to an additional mode excited by the additional parasitic frequencies.

Figure 11:
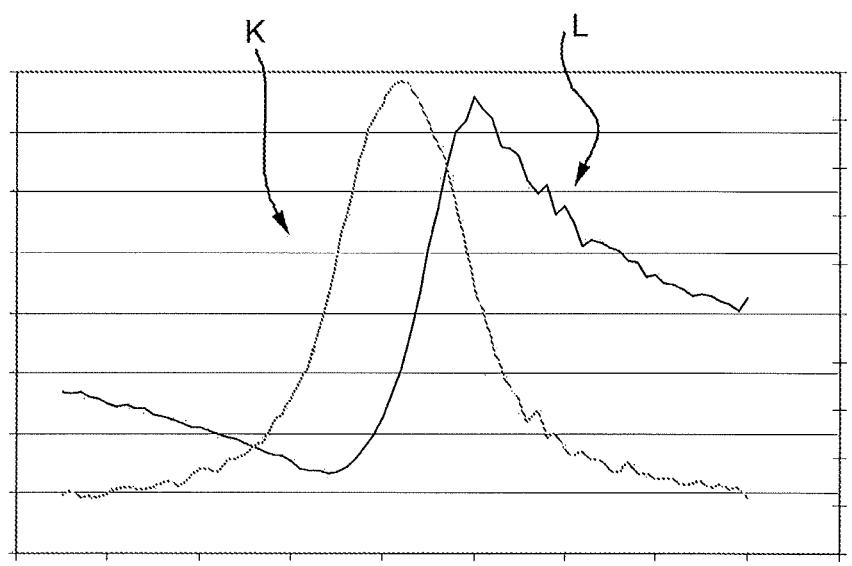
FIG. 11 shows the plot of the module and of the phase of the mechanical impedance of a sonotrode according to the present invention as a function of the vibration frequency and at a constant-value of sealing force.

Differently, as shown in FIG. 11, the plots K, L of the module and the phase of the impedance as a function of frequency and at a constant value of sealing force for sonotrode 1 lack both low-frequency inflections and the succession of very close local maxima and minima.

This is due to the fact that the vibration of sonotrode 1 lacks the above-mentioned additional frequencies.

As a consequence, even when they are particularly long, the transversal sealing bands 5 carried out by sonotrode 1 are particularly uniform. This is due to the fact that the same head 15 houses a plurality of piezo-electric elements 13 and to the fact that the plane P is not crossed by slots 23, 27.

Furthermore, due to the fact that slots 23 extend within portion 21 only, water stagnation is limited to portion 21 only and substantially prevented in portion 22. Accordingly, the power losses due to water stagnation are dramatically reduced, so increasing the likelihood that transversal sealing bands 5 are completely sealed.

Sealing rings 40, 42 are effective in reducing the transmission of the vibration from head 15 to elements 31, 45 and crossbar 50.

Finally, the Applicant has found that due to the fact that it has an odd number of drive unit 12, sonotrode 1 exhibits parasitic frequencies at higher distance from one another than the known sonotrodes having an even number of drive unit.

Clearly, changes may be made to sonotrode 1 described herein without, however, departing from the scope of the present invention.

In particular, head 15 could comprise, instead of edge 20, a plurality of attack elements which are connected to jaw 6.

In this case, the attack elements define respective nodal point of head 15 and lie on plane P while slots 23, 27 are detached from plane P.

The invention claimed is:

1. A sonotrode comprising:
    a head which defines a sealing surface elongated along a first direction; and
    at least one first and one second drive unit distinct from one another, each comprising at least one piezo-electric element;
    wherein said first and second drive units are electrically connectable to a unique generator so as to cause oscillation of said head along a second direction transversal to said sealing surface with a wave having a given wavelength during operation;
    the height of said head measured along said second direction being substantially equal to the half of said wavelength of said oscillation in the direction of said second direction;
    said sonotrode further comprising:
    at least one first slot which extends through said head transversally to said first and second directions;
    at least a finite number of nodal points where an amplitude of the oscillation of said head during operation is substantially equal to zero; and
    a plane on which at least some of said nodal points lie and which divides said head into a first portion and in a second portion;
    wherein said at least one first slot extends completely within one only of said first portion and said second portion, said at least one first slot being spaced apart from said plane.

2. The sonotrode of claim 1, wherein said first portion defines said sealing surface, and in that said first slot extends for its entire length within said first portion.

3. The sonotrode of claim 1, wherein said drive units are connected to said second portion, and by comprising at least one second slot which extends for its entire length within said second portion.

4. The sonotrode of claim 3, wherein said at least one second slot extends on the opposite side of plane with respect to said at least one first slot, and is at the prolongation of said at least one first slot along said second direction.

5. The sonotrode of claim 1, wherein said head comprises a continuous first edge which defines an infinite number of said nodal points and which lie on said plane; said at least one first slot extending between said sealing surface and said first edge.

6. The sonotrode of claim 1, comprising a casing which accommodates said head and is connectable, during operation, to a packaging machine, and in that said head is connected to said casing along said first edge.

7. The sonotrode of claim 6, wherein said casing comprises:
    a box-shaped element which houses one between said first and second portion;
    at least one additional elements which define a compartment which, in turn, houses the other between said first and second portion;
    said box-shaped element comprising a second edge against which said first edge is arranged;
    said second edge of said box-shaped element being connected to said at least one of said additional elements, so as to maintain said first edge in a given position.

8. The sonotrode of claim 7 comprising:
a first sealing ring interposed between a said first edge and said box-shaped element along said second direction; and
a second sealing ring, opposite to said first sealing ring relative to said first edge, which is interposed between said first edge and said at least one additional element along said second direction.

9. The sonotrode of claim 8, wherein said first and second sealing ring are interposed between respective shoulders of said head and a relief of said box-shaped element transversally to said first and second direction.

10. The sonotrode of claim 1, comprising an odd number of said drive units.

11. A packaging machine for producing sealed packages, comprising sealing means for sealing the packaging material; said sealing means comprising an anvil and a sonotrode; wherein said sonotrode is a sonotrode as claimed in claim 1.

12. The packaging machine of claim 11, comprising an unique generator electrically connected to the first and second drive unit of said sonotrode.

13. The packaging machine of claim 11, wherein said anvil and said sonotrode are carried respectively by a first and a second jaw; said second jaw being fixed to said second edge of said first box-shaped element;
said packages being produced, during operation, from a tube of packaging material fed along a vertical path, filled continuously with said food product, and gripped at equally spaced cross sections.

14. A sonotrode comprising:
a head possessing oppositely facing first and second surfaces, and oppositely disposed lateral sides each extending between the first and second surfaces, the head including an uninterrupted sealing surface extending along a first direction between lateral sides of the head;
a first drive unit possessing at least one piezo-electric element;
a second drive unit possessing at least one piezo-electric element;
the first drive unit and the second drive unit being separate from each other;
the first drive unit and the second drive unit each being electrically connectable to a unique generator to oscillate the head along a second direction, transverse to the first direction, with a wave possessing a wavelength during operation;
the head possessing a height extending along the second direction, the height being substantially equal to half of the wavelength of the oscillation of the head during operation;
a finite number of nodal points where the amplitude of the oscillation of the head during operation is substantially equal to zero;
at least some of the nodal points lying along a nodal plane which is located opposite the sealing surface; and
a slot extending through the head transversally to the first and second directions, the slot being offset from the nodal plane and positioned between the lateral sides of the head.

15. The sonotrode of claim 14, wherein an uninterrupted portion of the first surface lies between the slot and the nodal plane.

16. The sonotrode of claim 14, further comprising a first casing element covering at least a portion of the first surface, and a second casing element covering at least a portion of the second surface.

17. A sonotrode comprising:
a head including: (i) a first surface, and (ii) a sealing surface extending along a first direction between lateral sides of the head;
a first drive unit possessing at least one piezo-electric element;
a second drive unit possessing at least one piezo-electric element;
the first drive unit and the second drive unit being separate from each other;
the first drive unit and the second drive unit each being electrically connectable to a unique generator to oscillate the head along a second direction, transverse to the first direction, with a wave possessing a wavelength during operation;
the head possessing a height extending along the second direction, the height being substantially equal to half of the wavelength of the oscillation of the head during operation;
a finite number of nodal points where the amplitude of the oscillation of the head during operation is substantially equal to zero;
at least some of the nodal points lying along a nodal plane, the nodal plane being positioned opposite the sealing surface such that the first surface is bounded by the nodal plane, the sealing surface and the lateral sides of the head; and
a slot offset from the nodal plane and extending through the head transversally to the first and second directions so that the slot forms an opening in the first surface, the opening being spaced apart from the sealing surface by a portion of the first surface of the head which extends continuously between the lateral sides of the head.

18. The sonotrode of claim 17, further comprising a casing covering at least the opening in the first surface.

* * * * *